United States Patent
Fuhr et al.

(10) Patent No.: US 7,501,790 B2
(45) Date of Patent: Mar. 10, 2009

(54) POWER SUPPLY SYSTEM FOR A STARTER DEVICE WITH A REVERSIBLE DISCONNECTION SWITCH

(75) Inventors: Steffen Fuhr, Holzgerlingen (DE); Ingo Richter, Markgroeningen (DE); Henning Stoecklein, Eberdingen (DE); Hans Braun, Leuven (BE); Josef Weigt, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 301 days.

(21) Appl. No.: 11/316,039

(22) Filed: Dec. 22, 2005

(65) Prior Publication Data
US 2006/0152083 A1 Jul. 13, 2006

(30) Foreign Application Priority Data
Dec. 30, 2004 (DE) .................. 10 2004 063 849

(51) Int. Cl.
*H01M 10/46* (2006.01)

(52) U.S. Cl. ..................... 320/104
(58) Field of Classification Search ................. 320/104, 320/107, 135, 136
See application file for complete search history.

(56) References Cited

U.S. PATENT DOCUMENTS 4,769,295 A 9/1988 Kudo et al.
5,818,121 A 10/1998 Krappel et al.

FOREIGN PATENT DOCUMENTS

DE 196 06 450 A1 8/1997
EP 0 800 193 10/1999

*Primary Examiner*—Edward Tso
(74) *Attorney, Agent, or Firm*—Michael J. Striker

(57) ABSTRACT

A power supply system for starter devices has an energy storage unit, a starter device supplyable with electrical energy from the energy storage unit, a power supply line which carries the electrical energy from the energy storage unit to said starter device, a disconnection switch between the energy storage device and the starter device, the disconnection switch being located reversibly and directly on the energy storage unit.

8 Claims, 3 Drawing Sheets

POWER SUPPLY SYSTEM FOR A STARTER DEVICE WITH A REVERSIBLE DISCONNECTION SWITCH

BACKGROUND OF THE INVENTION

The present invention relates to a power supply system for a starter device.

From German Published Patent Disclosure 196 06 450 A1, a power supply system for starter devices is known which comprises an energy storage means and a starter device, the latter connected to the energy storage means by means of a power supply line. The power supply line can be interrupted by means of a disconnection switch. The disconnection switch is secured to the energy storage means or very close to the energy storage means. The disconnection switch itself is described as a gas-generator-driven switch to be ignited, which sets an irreversible disconnection process in motion. A disadvantage of this system is that after a disconnection, the switch must be replaced.

SUMMARY OF THE INVENTION

Accordingly, it is an object of the present invention to provide a power supply system for a starter device, which provides advantages in the corresponding systems in the prior art.

In keeping with these objects and with others which will become apparent hereinafter, one feature of the present invention resides, briefly stated, in a power supply system for starter devices, comprising energy storage means; a starter device supplyable with electrical energy from said energy storage means; a power supply line which carries the electrical energy from said energy storage means to said starter device; a disconnection switch between said energy storage device and said starter device, said disconnection switch being located reversibly and directly on said energy storage means.

The power supply system of the invention has the advantage that on the one hand the disconnection switch can be activated whenever the starter device is not needed. As a result, the starter device, typically located in the crash region of a vehicle, can be connected reversibly to be voltage-free at any time when the starter device is not needed for its intended purpose. In an accident, there is accordingly from the outset no risk of an electrical spark or other threats that can occur in conjunction with high current intensities. There is also no longer a risk of short circuits in visits to the shop, for repairs to the vehicle.

The system is especially inconspicuous and requires no unnecessary space whenever the disconnection switch is adapted in size to a battery terminal well.

It is especially advantageous if the disconnection switch is seated entirely in the battery terminal well. A reversible disconnection switch can be realized especially simply and economically by means of an electromagnetic switch.

In one exemplary embodiment of a disconnection switch, an especially compact structure is obtained whenever the disconnection switch has a magnetic circuit that surrounds a battery terminal.

It is also provided that the disconnection switch has a contact bridge, which is intended for connecting a double contact. This embodiment assures that two disconnection points must be bridged between the starter device and the energy storage means. This makes for especially secure disconnection.

In a further feature, it is provided that a busbar that holds the disconnection switch is secured to the battery terminal. Because of how it is secured, no further retaining elements are needed for securing the disconnection switch in a fixed way.

The novel features which are considered as characteristic for the present invention are set forth in particular in the appended claims the invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1A:
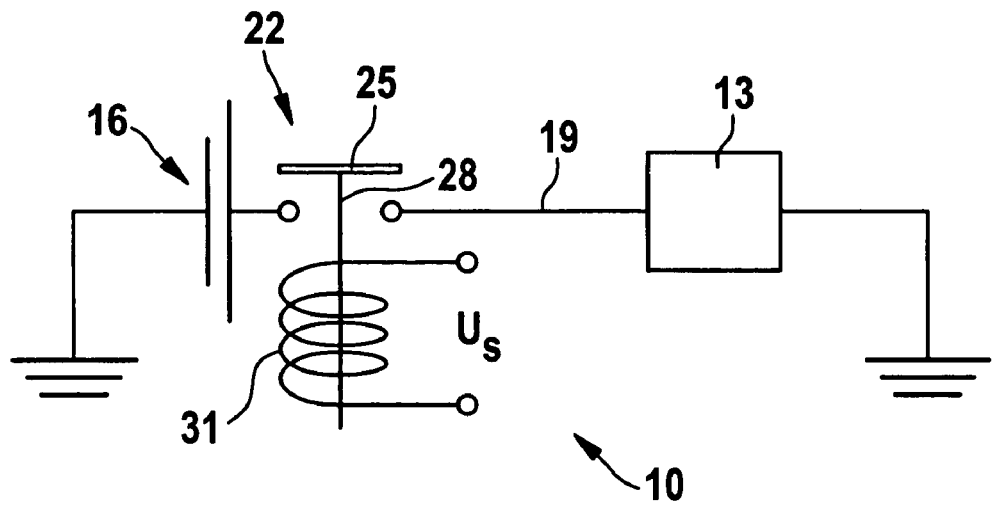
FIGS. 1a through 1c show schematic illustrations of an power supply system.

In FIG. 1a, a power supply system 10 for starter devices 13 is shown. In addition to the starter device 13, this power supply system 10 has an energy storage means 16, which may for instance be embodied as a possible starter battery. Located between the energy storage means 16 and the starter device 13 is a power supply line 19, which as a "starter cable" supplies the starter device 13 with electrical energy. Also located between the energy storage means 16 and the starter device 13 is a disconnection switch 22, which is embodied as a reversible disconnection switch 22 and is located directly on the energy storage means 16.

The disconnection switch 22 has a contact bridge 25, by means of which two contacts, not identified here by reference numerals, can be connected electrically in order to be able to set the starter device 13 in motion. The disconnection switch 22 or contact bridge 25 is movable by means of an armature 28, which is actuatable by means of an electromagnetically functioning coil 31. In the actuation situation, a coil voltage $U_s$ is applied to the coil 31. The starter device 13 shown in FIG. 1a can for instance be a starter operating on the principle of inertia, which makes do without an engagement relay.

Figure 1B:
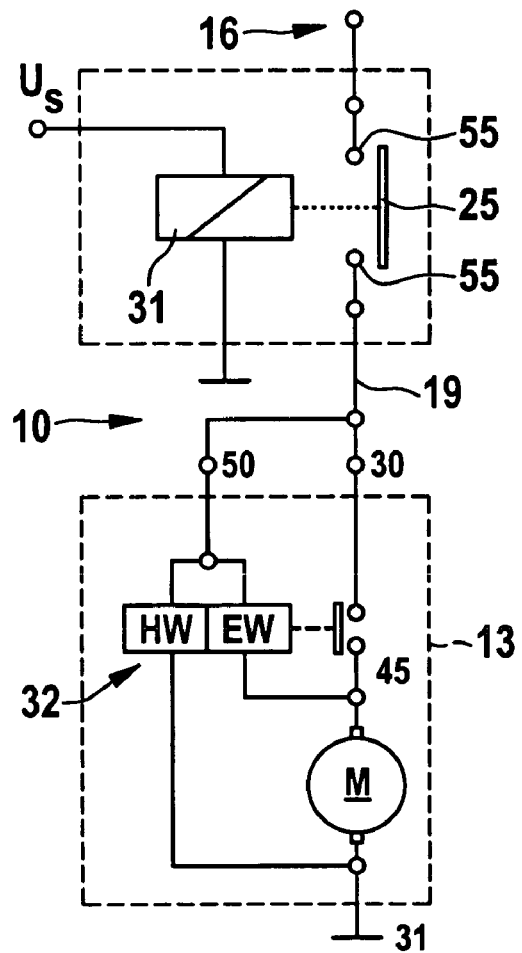

In FIG. 1b, a power supply system 10 for conventional starter devices 13 (insert-and-turn starters) is shown in somewhat more detail. In this view, the disconnection switch 22 and its coil 31 are supplied with current by an ignition/starting switch or start control unit. By means of the contact bridge 25, both the "terminal 30", which typically supplies the starter motor with electrical power, and the "terminal 50", which supplies current to an engagement relay 32. A pull-in winding EW and hold-on winding HW are located in the engagement relay 32.

Figure 1C:
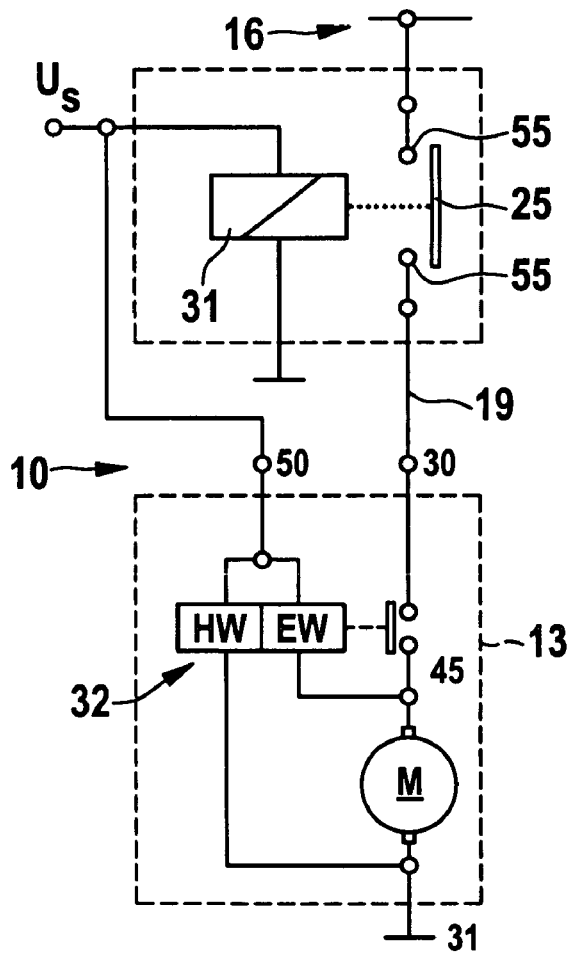

In FIG. 1c, a power supply system 10 for conventional starter devices 13 (insert-and-turn starters) is shown that is slightly modified compared to FIG. 1b. In this view, the disconnection switch 22 and its coil 31 are supplied with current by an ignition/starting switch or start control unit. By means of the contact bridge 25, only the "terminal 30" is supplied with power. The "terminal 50" is supplied with current directly from an ignition/starting switch or start control unit.

Figure 2:
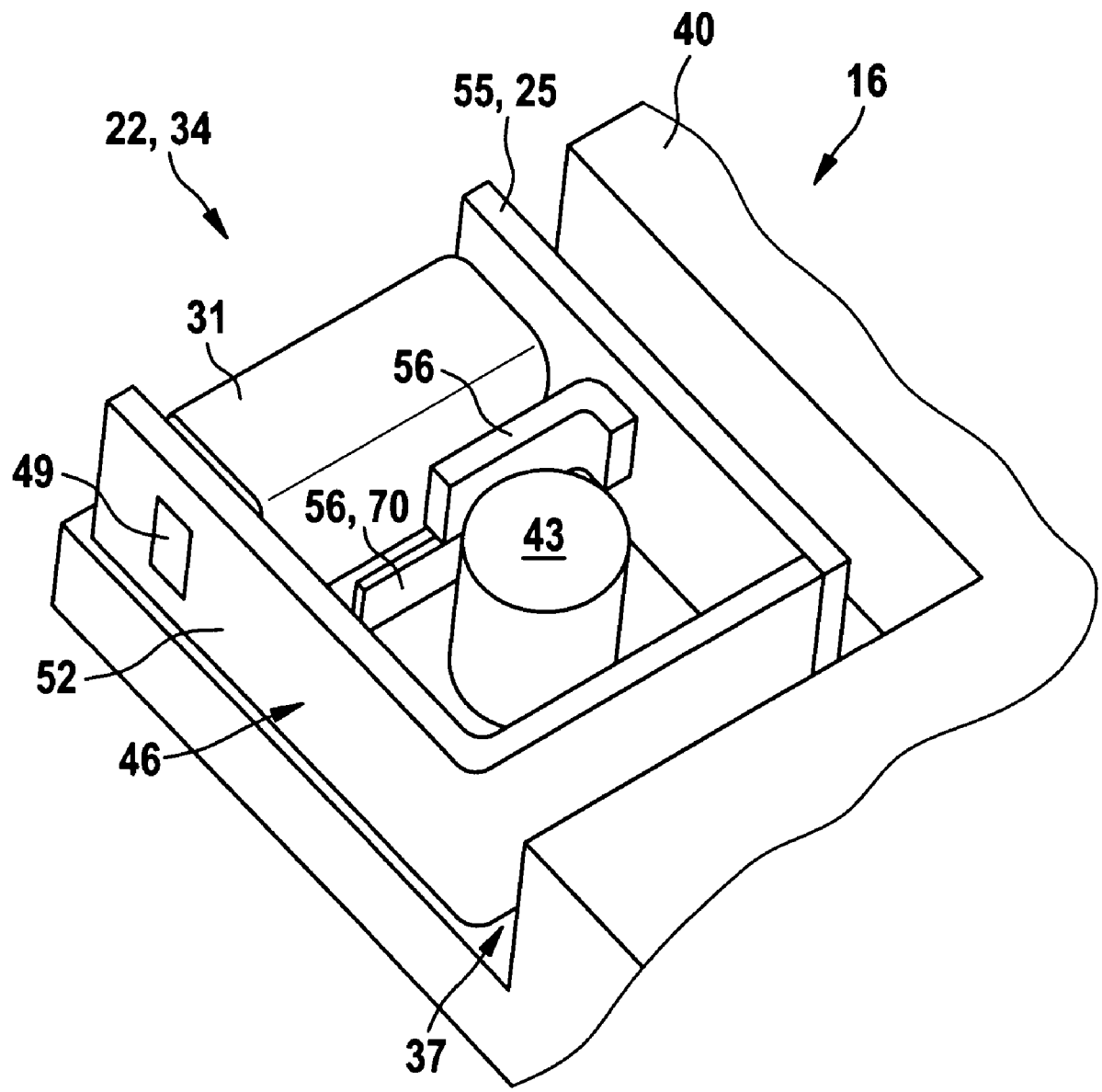
FIG. 2 is a three-dimensional view of a first disconnection switch.

In FIG. 2, a first exemplary embodiment of a disconnection switch 22 is shown. The disconnection switch 22 here is embodied as a so-called flap armature relay 34. The disconnection switch 22 is seated here in a battery terminal well 37, of the kind typically present in battery caps 40. The battery terminal 43, to which the disconnection switch 22 is secured, is seated in this battery terminal well 37. The disconnection switch 22 is adapted in size to the battery terminal well 37 and is also seated here entirely in the battery terminal well 37.

For optimal utilization of the battery terminal well 37, it is provided here that the disconnection switch 22 has a magnetic circuit 46, which surrounds the battery terminal 43. This electromagnetic circuit 46 here includes for instance a core 49, which is surrounded by the coil 31. It also includes a bracket 52, which represents a direct electromagnetic extension of the core 49. Finally, a flap armature 55 begins at this bracket 52 and is attracted to the core 49 by the switching on of the coil 31 and the buildup of the electromagnetic field in the electromagnetic circuit 46. Because of this extension of the flap armature 55, which moreover corresponds to the contact bridge 25, two double contacts 56 are connected to one another electrically conductively. Since the power supply line 19 is connected to one of the two double contacts 56, the starter device 13 is then supplied with current. The lower of the two double contacts 56 in FIG. 2, as a load busbar 70, corresponds to the terminal 30, as it is typically designated in conformance with standards.

The disconnection switch 22 is retained and secured on the busbar 70. This terminal 30 here serves not only for mechanically securing the disconnection switch 22 but also for directly contacting the disconnection switch 22 electrically to the energy storage means 16. The second double contact 56, which is located above the first double contact 56, corresponds as a load busbar to the so-called terminal 45, and this is again a designation that conforms to standards. This "terminal 45" is extended to the outside in insulated fashion. The power supply line 19 is screwed or secured in some other way to this load busbar (terminal 45), so that this power supply line 19 is free of voltage when the flap armature 55 is open. If current is supplied to the coil 31 via a trigger signal (terminal 50), the flap armature 55 is attracted and closes the primary contact. Current is supplied to the starter device 13, and the starting process can take place.

Figure 3:
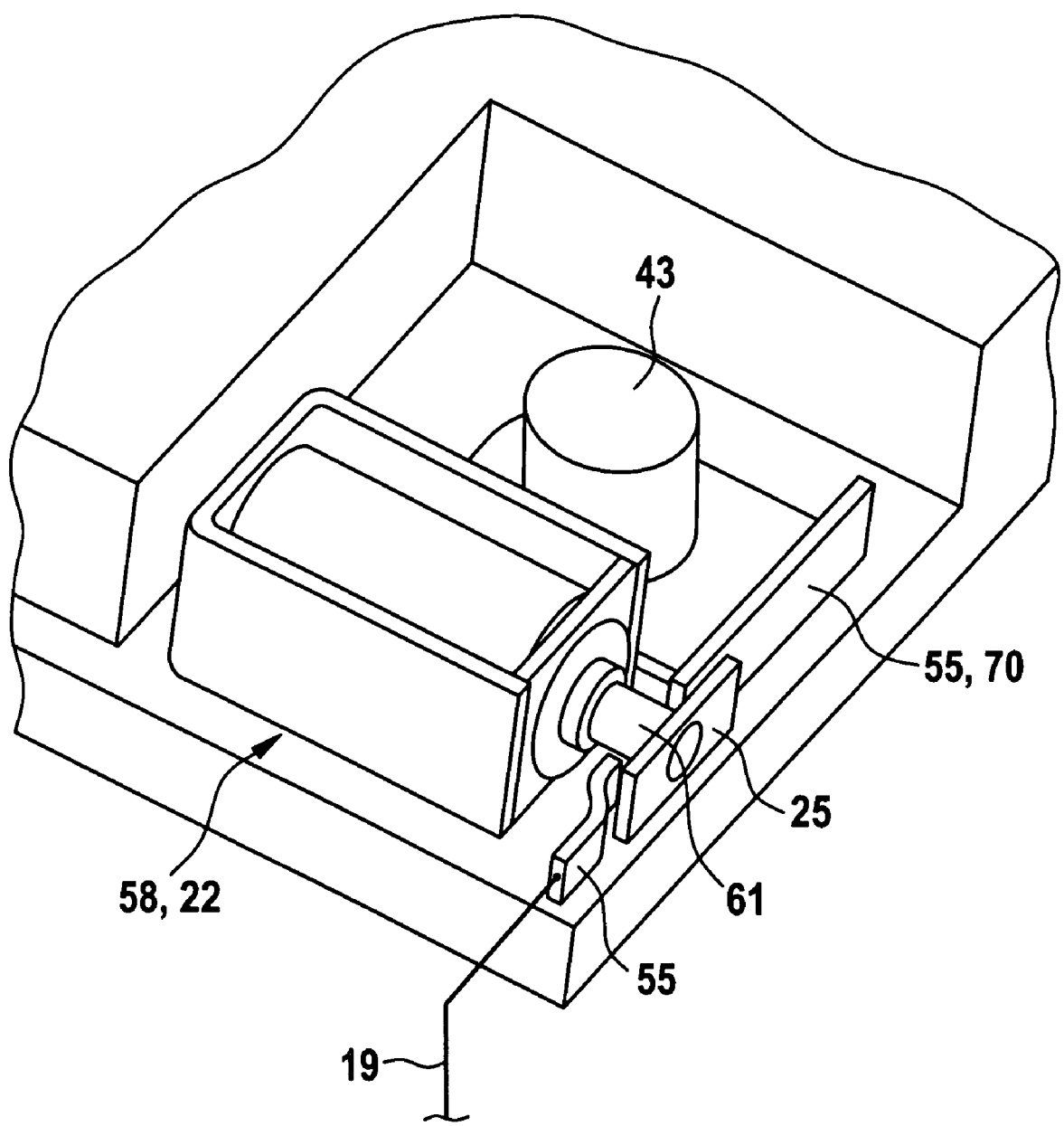
FIG. 3 is a three-dimensional view of a second exemplary embodiment of a disconnection switch.

In FIG. 3, a second exemplary embodiment for a disconnection switch 22 is shown. This disconnection switch 22 is likewise adapted, as described above, to the battery terminal well 37. The plunger armature relay 58 shown in FIG. 3 functions in a similar manner to the flap armature relay 34. The plunger armature relay 58 likewise has a coil 31, and an armature 61 is displaceably supported in its center. On the free end of the armature 61, located outside the coil 31, there is a contact bridge 25.

The double contacts 55 are located one on either side of the contact bridge 25. The double contact 55 oriented toward the energy storage means 16 is embodied as a busbar 70, on which the disconnection switch 22 is retained and secured. The other double contact 55, to which the power supply line 19 is secured, is located on the other side of the contact bridge 25, and hence in the direction toward the starter device 13. The function of this plunger armature relay 58 is the same as for the flap armature relay 34. If the relay 58 receives a trigger signal (terminal 50), then the double contacts 55 are closed via the contact bridge 25, and current is supplied to the starter device 13.

It will be understood that each of the elements described above, or two or more together, may also find a useful application in other types of constructions differing from the types described above.

While the invention has been illustrated and described as embodied in a power supply system for a starter device, it is not intended to be limited to the details shown, since various modifications and structural changes may be made without departing in any way from the spirit of the present invention.

Without further analysis, the foregoing will reveal fully reveal the gist of the present invention that others can, by applying current knowledge, readily adapt it for various applications without omitting features that, from the standpoint of prior art, fairly constitute essential characteristics of the generic or specific aspects of the invention.

The invention claimed is:

1. A power supply system for starter devices, comprising energy storage means; a starter device supplyable with electrical energy from said energy storage means; a power supply line which carries the electrical energy from said energy storage means to said starter device; a disconnection switch between said energy storage device and said starter device, wherein said disconnection switch is reversible and is located directly on said energy storage means, wherein said disconnection switch is configured so that it is adapted in size to a battery terminal well, and wherein said disconnection switch is seated entirely in the battery terminal well.

2. A power supply system as defined in claim 1, wherein said disconnection switch is configured as an electromagnetic switch.

3. A power supply system as defined in claim 2, wherein said disconnection switch has a magnetic circuit which surrounds a battery terminal.

4. A power supply system as defined in claim 1, wherein said disconnection switch is a flap armature relay.

5. A power supply system as defined in claim 1, wherein said disconnection switch is a plunger armature relay.

6. A power supply system as defined in claim 1, wherein said disconnection switch has a contact bridge for connecting a double contact.

7. A power supply system as defined in claim 1; and further comprising a busbar that holds said disconnection switch and is secured to a battery terminal.

8. A power supply system for starter devices, comprising energy storage means; a starter device supplyable with electrical energy from said energy storage means; a power supply line which carries the electrical energy from said energy storage means to said starter device; a disconnection switch between said energy storage device and said starter device, wherein said disconnection switch is reversible and is located directly on said energy storage means, and wherein said disconnection switch has a magnetic circuit which surrounds a battery terminal.

* * * * *